United States Patent
Cox et al.

(10) Patent No.: US 6,539,475 B1
(45) Date of Patent: Mar. 25, 2003

(54) METHOD AND SYSTEM FOR PROTECTING DIGITAL DATA FROM UNAUTHORIZED COPYING

(75) Inventors: Ingemar J. Cox, Lawrenceville, NJ (US); Matthew L. Miller, Princeton, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/215,960

(22) Filed: Dec. 18, 1998

(51) Int. Cl.[7] .................. H04N 7/16; H04N 7/167; H04L 9/28
(52) U.S. Cl. ............. 713/100; 713/176; 713/193; 705/57; 380/201; 380/202; 380/203
(58) Field of Search .................. 713/176, 193; 380/201–203; 705/57

(56) References Cited

U.S. PATENT DOCUMENTS

| | | | |
|---|---|---|---|
| 5,319,735 A | | 6/1994 | Preuss et al. |
| 5,574,787 A | * | 11/1996 | Ryan ........................ 380/5 |
| 5,687,191 A | | 11/1997 | Lee et al. |
| 5,708,717 A | | 1/1998 | Alasia |
| 5,745,569 A | * | 4/1998 | Moskowitz et al. .......... 380/23 |
| 5,809,139 A | * | 9/1998 | Girod et al. ................ 380/5 |
| 5,838,791 A | | 11/1998 | Torii et al. |
| 5,848,155 A | | 12/1998 | Cox |

* cited by examiner

Primary Examiner—Gail Hayes
Assistant Examiner—Taghi T. Arani
(74) Attorney, Agent, or Firm—Scully, Scott, Murphy & Presser

(57) ABSTRACT

Data is protected from unauthorized copying by rescrambling an unauthorized version of the data, but descrambling an authorized version of the data. This is done using a trigger signal. One property of the trigger signal is that it is preserved through signal transformations, such as one or more of compression, decompression, analog to digital conversion, and digital to analog conversion. As a result of this property the trigger signal can be detected in either scrambled or descrambled data. The trigger signal is embedded into the data to form watermarked data. The watermarked data is passed through a descrambler, where the trigger signal, if present, is extracted. A descrambling key and a descrambling algorithm are applied to the watermarked data if the trigger signal is present, but not applied to the watermarked data if the trigger signal is not present.

12 Claims, 3 Drawing Sheets

| a | b | c | l | a | b | k | l | a |
|---|---|---|---|---|---|---|---|---|
| l | k | d | k | j | c | j | i | b |
| i | j | e | h | i | d | g | h | c |
| h | g | f | g | f | e | f | e | d |
| j | k | l | i | j | k | h | i | j |
| i | h | a | h | g | l | g | f | k |
| f | g | b | e | f | a | d | e | l |
| e | d | c | d | c | b | c | b | a |

FIG. 2

METHOD AND SYSTEM FOR PROTECTING DIGITAL DATA FROM UNAUTHORIZED COPYING

FIELD OF THE INVENTION

This invention relates to methods and systems for protecting digital data, such as multi-media presentations, digital video presentations, and vendored software to be installed, from unauthorized copying.

BACKGROUND OF THE INVENTION

The rapid increase in digital methods of recording and distributing data has made it difficult for owners of copyrights on such data as images, audio recordings, and software programs to enforce their rights regarding that data. Specifically, it has become very easy for people to illegally produce and redistribute high-fidelity copies of the data.

Traditionally, the primary tool used to enforce copyrights is encryption, or scrambling. Here, data is modified in such a way that the data is useless without special descrambling hardware or software, as well as scrambling keys, possession of which indicates a right to use the data. For example, movies on digital versatile disks (DVD's) are scrambled using keys that are hidden in the lead-in area of the disk. The keys should only appear on original, factory-pressed disks, so only, the owners of such disks have the ability to descramble and view the movies.

One of the principal weaknesses of this tool is that the protection must be removed before the data can be used (i.e. the data must be descrambled). If a person who is not authorized to make copies of the data is able to insert a recording device after the descrambler, an unprotected and descrambled copy of the data can be made, and distributed to others who also do not have the right to use the data (e.g. have not paid for a factory-pressed disk, and, consequently, have not paid any royalty to the copyright owner). Similarly, such perfect, illegal copies can also be distributed by an unauthorized distributor who succeeds in "breaking" the scrambling by developing a method of either identifying the keys (e.g. reading the lead-in area of a DVD) or descrambling without a key.

The present invention helps protect descrambled data in a single, but important, context: the use of these illegal copies on legitimate or compliant devices which can also use legal, scrambled data. A compliant device is a device which detects the key in the data before the data can be used in conjunction with the device. For example, a movie with a key recorded on a DVD is placed into a compliant player. The player will detect the key and then descramble the subsequent data to enable viewing of the movie. The invention represents a modification, or addition, to the basic method of data scrambling which causes descrambles to render illegal copies of data useless. This is important since most consumers of data will own only one device for using the data, and, if that device contains a descrambler designed according to the present invention, it will be incapable of using illegal copies. Thus, the market for illegal copies is substantially reduced.

SUMMARY OF THE INVENTION

The present invention protects data from unauthorized copying. The data can be uncompressed or compressed, such as in the form of MPEG Multimedia data. The protection is accomplished by the legitimate device searching for and detecting a trigger signal, preferably in the form of a digital watermark or other steganographic embedded data in the data. If the embedded watermark or other steganographic data is present, the data is considered to be a scrambled copy. The device itself makes no distinction between authorized and unauthorized data, but descrambles the input data if a trigger signal is detected, without regard to the copy of the data being authorized or unauthorized. Thus, for unauthorized copies that contain a trigger signal with unscrambled data (the most common form of unauthorized copy) the descrambler will render the data useless.

The effect of the method and system of our invention is to rescramble an unauthorized version of the data, but descramble an authorized version of the data. This is done using the trigger signal. One property of the trigger signal is that it is preserved through signal transformation, such as one or more of compression, decompression, analog to digital conversion, and digital to analog conversion.

The trigger signal is embedded into the data in the manner of inserting a digital watermark into data to form watermarked data. The use of digital watermarking techniques to embed the trigger signal is preferred because a trigger signal inserted this way is capable of being detected even after the watermarked data is subject to signal transformation. The watermarked data is passed through a descrambler, where the trigger signal, i.e. watermark, if present; is extracted. A descrambling key and a descrambling algorithm are applied to the data if the trigger signal is present, but are not applied to the data if the trigger signal is not present.

In the present invention, data that is to be protected, such as software, images, audio, or video, is scrambled, and is also modified to contain an embedded signal, or "trigger" signal to indicate that the data has been scrambled. The scrambling is performed in such a manner that the embedded signal can be detected in both scrambled and descrambled data. Any device or piece of software that is to use the data must test for the embedded signal to determine whether or not the data should be descrambled, and apply the appropriate descrambling algorithm if the signal is found. The result of this invention is that, if descrambled data is illegally copied and subsequently played in a legitimate device, the embedded trigger signal will activate the descrambler, which will then render the data unusable (since "descrambling" data which is not scrambled in the first place produces unusable results). Variants of the invention include embedding descrambling keys in the data, hiding keys on physical media, and using media "fingerprints", such as patterns of bad sectors on a hard disk, as keys.

OBJECTS OF THE INVENTION

A principal object of the present invention is therefore, the provision of protection of data from unauthorized copying.

Another object the invention is the provision of a trigger signal embedded into data to be protected so that upon detection of the trigger signal only authorized copies of data may be rendered useable.

Another object of the invention is provision of a trigger signal for use in copy protection where the trigger signal is embedded into data in such a manner as to be unaffected by subsequent processing of the data containing the trigger signal.

Further and still other objects of the invention will become more clearly apparent the following specification is read in conjunction with the accompanying drawing.

BRIEF DESCRIPTION OF THE DRAWING

FIG. 2 shows a possible pattern of 8×8 blocks used in the data embedding algorithm.

DETAILED DESCRIPTION OF THE INVENTION

Figure 1A:
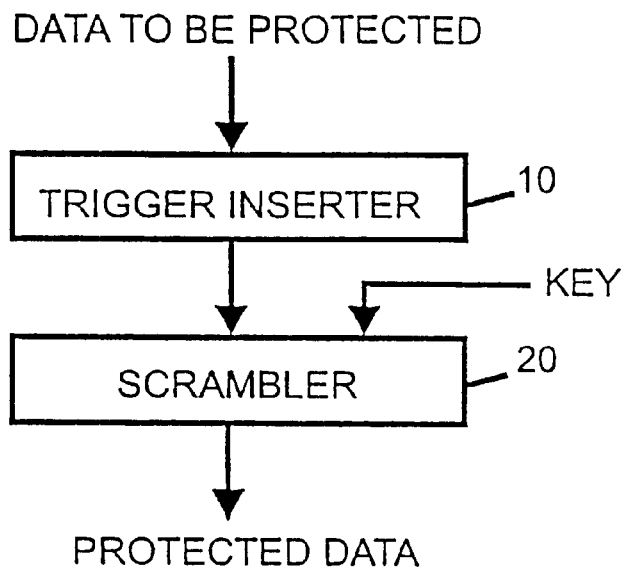
FIGS. 1a and 1b show two alternative data flow diagrams for preparing data according to the invention.
Figure 1B:
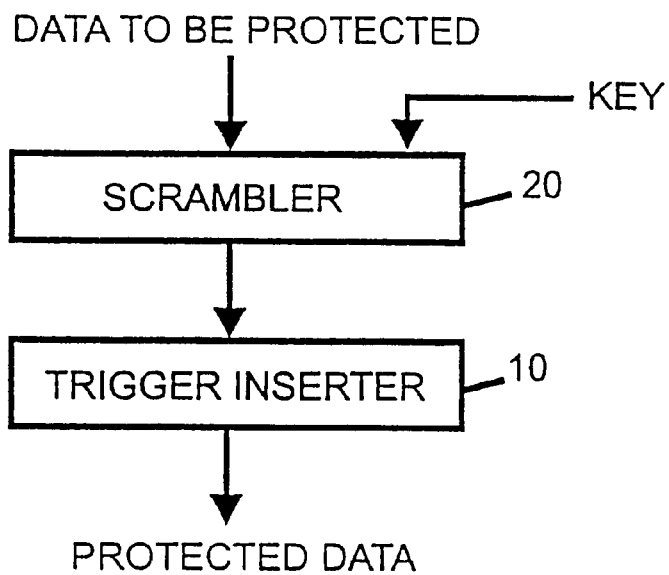

Referring now to the figures, and to FIGS. 1a and 1b in particular, there are shown two alternative flow diagrams of the general algorithm for preparing data according to the present invention. In FIG. 1a, the data to be protected first has the "trigger" signal inserted by the TRIGGER INSERTER 10, and is then scrambled by the SCRAMBLER 20 according to a given key. In FIG. 1b, the sequence of the procedure is reversed. That is, the data to be protected and a given key are provided as inputs to SCRAMBLER 20. The trigger signal is then inserted into the scrambled data by TRIGGER INSERTER 10. Since the SCRAMBLER must be designed in such a way that it does not interfere with trigger detection, the SCRAMBLER will not interfere with trigger signal insertion either, in which case the two steps of FIGS. 1a and 1b may be performed in either order. The sequence of steps shown in FIG. 1b is the preferred implementation. However, future implementations may require the operations be performed in one or the other sequence.

Several existing methods of embedding information in various types of data can be used for the TRIGGER INSERTER. Cox et al., *Secure Spread Spectrum Watermarking for Multimedia,* IEEE Transactions on Image Processing, Vol. 6, No. 12, pp 1673–1687, 1997, describes methods of embedding information into, and extracting that information out of, images. U.S. Pat. No. 5,319,735 by R. D. Preuss, for example, describes methods for insertion of digital information into audio signals. In all these cases, the data can be used without the embedded information being removed. That is to say: the information embedded in the images is invisible; that embedded in audio is inaudible; etc. In theory, any data that contains redundancy in its representation can have information embedded in it. Thus, it is also possible to embed information in software, by, for example, varying the order in which operations are performed when such variations won't effect the software's behavior.

The simplest form of the present invention makes only very limited use of the information embedding algorithm chosen. It embeds only a single message that indicates the presence or absence of a trigger signal. When the data is to be used by a legitimate or compliant device or software, the presence of this message acts as a trigger to activate descrambling. However, the watermarked signal may contain significantly more information than simply the presence or absence of the trigger signal. In an alternative implementation of the invention, the information embedding method can also be used to embed all or part of the key with which the data is scrambled, thus providing a method of ensuring that only devices with information extractors have all the information required to descramble and use the data.

In the preferred implementation of the invention, data is divided into groups of blocks, whose average magnitudes form a signal that the information is embedded into. For example, when the data is an image, the image might first be divided into 8×8 blocks. These blocks can then be divided into L groups as shown in FIG. 2. When all the blocks labeled 'a' are averaged together with each other, and all the blocks labeled 'b' are averaged together, etc., the result is a sequence of L averaged 8×8 blocks. The insertion algorithm inserts the information into this sequence of L blocks by modifying the image so that the averaging process results in a signal which correlates with the embedded message.

The SCRAMBLER 20 must be designed in such a way that the information extraction method works equally well on scrambled and unscrambled data, even though scrambled data is unusable for its intended purpose (e.g. images are unviewable, software is unexecutable, etc.). In the preferred implementation, we use a scrambling method that rearranges blocks within each group of blocks, but does not move any blocks from one group into another. The key is used as input into a pseudo-random number generator to determine the rearranging. For example, the upper left 8×8 block shown in FIG. 2 is labeled as being in group 'a'. In a scrambled image, this block might be swapped with any other block labeled 'a', but not with any blocks labeled 'b', 'c', etc. Since the information extraction method first averages together all the blocks with the same labels, and the result of averaging is independent of the order of the values being averaged, the extractor will work equally well with scrambled and unscrambled data, even though the scrambled data, being out of order, is unviewable or unexecutable.

An alternative method of scrambling is to further exploit the redundancies of the previously discussed methods by rearranging the DCT coefficient values within the 8×8 blocks. The values that are rearranged are those values which are combined to form a single element of the coefficients of the trigger signal. The result is a stronger scrambling method, but at a higher cost and with an adverse effect on compression rates.

In general it is possible to construct a scrambling algorithm that does not affect a given watermark detection algorithm by (1) identifying groups of values in the watermarked data that are combined in the detection algorithm by means of a commutative process and (2) reordering values within the identified groups.

Figure 3:
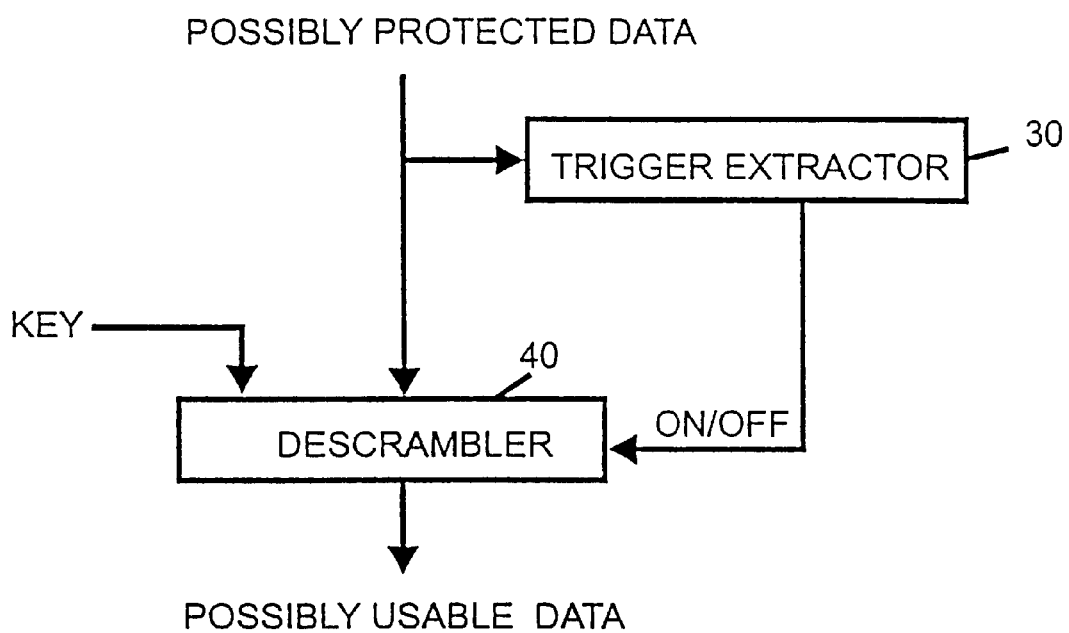
FIG. 3 shows a data flow diagram for a device that uses data prepared according to FIG. 1.

FIG. 3 shows a data flow diagram for the general method of using data which has been protected according to the present invention. The data that comes in might or might not be scrambled. It first enters the TRIGGER EXTRACTOR 30, which employs the information extraction method to determine whether or not the trigger signal is present. This determination is used to turn the DESCRAMBLER 40 on or off.

The DESCRAMBLER takes the possibly scrambled data as input, as well as a key, which might be obtained from a secret region of the storage that the data is stored on, such as the lead-in area of a DVD. Alternatively, the key might be obtained from a hard-to-modify physical property of the storage, such as the pattern of bad sectors on a magnetic disk, or from any other device for certifying that the user has permission to use the data. Once the data is a descrambled, the protection from scrambling is lost, but the trigger is still embedded in the data. Thus, if someone tries to copy the descrambled data and play it back on a legitimate device, the trigger signal will be detected and the DESCRAMBLER will be turned on. The key in such a case is likely to be nonsense. It is easy to see that, in such a case, the DESCRAMBLER that corresponds to the preferred SCRAMBLER described above will rearrange the data at random and render the data useless. Thus, such illegal copies can only be used on devices that are not equipped with the TRIGGER EXTRACTOR and DESCRAMBLER, and a user will require two versions of the device or software in order to use both legitimate and illegitimate copies of data.

The invention is best employed in contexts where it is unlikely that users will want two devices for the same function. For example, most users will not wish to have two DVD players, so the present invention is useful for protecting audio and video stored on DVD's. Similarly, most users don't want to switch back and forth between two versions of an operating system, so, if the operating system performs trigger detection and possible descrambling on each piece of software it loads, most users will be deterred from using both legal, scrambled, and illegal, unscrambled, copies of protected software.

While the invention has been described with respect to certain preferred embodiments and exemplifications, further modifications and variations are possible without deviating from the broad teachings and the spirit of the invention which shall be limited solely by the scope of the claims appended hereto.

What is claimed is:

1. A method of protecting data from unauthorized copying comprising the steps of:
   embedding a watermark signal having a trigger signal into data to be protected to form watermarked data, said watermark and trigger signals being preserved during signal transformation;
   providing said watermarked data to a descrambler;
   extracting the trigger signal from said watermark signal, and
   descrambling said watermarked data if said extracted trigger signal has a predetermined value;
   further comprising first embedding the trigger signal into the data to be protected to form watermarked data and thereafter scrambling the watermarked data,
   where said scrambling comprises dividing said watermarked data into groups of data that are combined during said extracting by means of a commutative process.

2. The method of claim 1, further comprising reordering values within said groups of data.

3. The method of claim 2, where said groups of data comprise blocks of data.

4. The method of claim 2, where said groups of data comprise transform coefficient values.

5. An apparatus for protecting data from unauthorized copying comprising:
   watermark inserter for embedding a watermark having a trigger signal into data to be protected to form watermarked data, said watermark and trigger signals being preserved during signal transformation;
   scrambler for scrambling said watermarked data;
   trigger extractor disposed for receiving said watermarked data and extracting said trigger signal from said watermark signal; and
   descrambler for descrambling said watermarked data when said extracted trigger signal has a predetermined value;
   where said scrambler divides said watermarked data into groups of watermarked data that are combined in said trigger extractor by means of a commutative process.

6. An apparatus for protecting data from unauthorized copying comprising:
   watermark inserter for embedding a watermark having a trigger signal into data to be protected to form watermarked data, said watermark and trigger signals being preserved during signal transformation;
   scrambler for scrambling said watermarked data;
   trigger extractor disposed for receiving said watermarked data and extracting said trigger signal from said watermark signal; and
   descrambler for descrambling said watermarked data when said extracted trigger signal has a predetermined value;
   where said scrambler reorders values within said groups of watermarked data.

7. An apparatus for protecting data from unauthorized copying comprising:
   watermark inserter for embedding a watermark having a trigger signal into data to be protected to form watermarked data, said watermark and trigger signals being preserved during signal transformation;
   scrambler for scrambling said watermarked data;
   trigger extractor disposed for receiving said watermarked data and extracting said trigger signal from said watermark signal; and
   descrambler for descrambling said watermarked data when said extracted trigger signal has a predetermined value;
   where said groups of watermarked data comprise blocks of watermarked data.

8. An apparatus as set forth in claim 6, where said groups of watermarked data comprise transform coefficients values.

9. A method of scrambling data comprising the steps of:
   scrambling data, said scrambling being based on a predetermined method of detecting a watermark signal in said data, said scrambling being performed by dividing said data into groups of data that are combined during detecting by means of a commutative process.

10. The method as set forth in claim 9, further comprising reordering values within said groups of data.

11. The method as set forth in claim 10, where said groups of data comprise blocks of data.

12. The method as set forth in claim 10, where said groups of data, comprise transform coefficient values.

* * * * *